(12) United States Patent
Hershberg (10) Patent No.: US 11,973,574 B1
(45) Date of Patent: Apr. 30, 2024

(54) SYSTEMS AND METHODS FOR PRIVATE COMMUNICATIONS NETWORKS

(71) Applicant: STS Global Inc., Stony Brook, NY (US)

(72) Inventor: David Hershberg, Port Jefferson, NY (US)

(73) Assignee: David Hershberg, Port Jefferson, NY (US)

( * ) Notice: Subject to any disclaimer, the term of this patent is extended or adjusted under 35 U.S.C. 154(b) by 0 days.

(21) Appl. No.: 15/617,312

(22) Filed: Jun. 8, 2017

(51) Int. Cl.
*H04B 7/185* (2006.01)
*G06Q 50/06* (2012.01)
*H04L 9/40* (2022.01)

(52) U.S. Cl.
CPC ......... *H04B 7/18565* (2013.01); *G06Q 50/06* (2013.01); *H04B 7/18586* (2013.01); *H04L 63/14* (2013.01)

(58) Field of Classification Search
CPC ............ H04B 7/18565; H04B 7/18586; G06Q 50/06; H04L 63/14
See application file for complete search history.

(56) References Cited

U.S. PATENT DOCUMENTS

| | | | | |
|---|---|---|---|---|
| 4,480,328 A | * | 10/1984 | Alaria | H04B 7/212 |
| | | | | 370/349 |
| 4,801,937 A | * | 1/1989 | Fernandes | H04B 10/29 |
| | | | | 323/357 |
| 4,931,802 A | * | 6/1990 | Assal | H04B 7/2046 |
| | | | | 342/356 |
| 5,548,294 A | * | 8/1996 | Sturza | H01Q 15/02 |
| | | | | 455/13.1 |
| 5,612,701 A | * | 3/1997 | Diekelman | H04B 7/2041 |
| | | | | 455/12.1 |
| 5,736,959 A | * | 4/1998 | Patterson | H04B 7/18589 |
| | | | | 342/372 |
| 5,796,715 A | * | 8/1998 | Patterson | H04L 49/25 |
| | | | | 455/12.1 |

(Continued)

FOREIGN PATENT DOCUMENTS

| | | | | |
|---|---|---|---|---|
| EP | 980192 A1 | * | 2/2000 | ......... H04B 7/18584 |
| EP | 1052869 A2 | * | 11/2000 | ........... H04B 7/2041 |

(Continued)

OTHER PUBLICATIONS

Hughes, "HX System, System Overview", Release 1.2.7, Rev. A, 106 pages (Sep. 2008).

(Continued)

*Primary Examiner* — Mehmood B. Khan
(74) *Attorney, Agent, or Firm* — Carter, DeLuca & Farrell LLP (57) ABSTRACT

Disclosed herein are systems and methods for private communications networks. In various embodiments, a communication system in accordance with the disclosed technology includes a private communications network that has earth stations configured to communicate with a multi-spot beam satellite. The earth stations are communicatively unreachable by communication sources that are remote from the earth stations and that are outside the private communications network, and the earth stations are distributed across geographies covered by different spot beams of the multi-spot beam satellite.

8 Claims, 6 Drawing Sheets

(56) References Cited

U.S. PATENT DOCUMENTS

| | | | | |
|---|---|---|---|---|
| 5,875,181 A * | 2/1999 | Hsu | | H04B 7/18515 |
| | | | | 370/320 |
| 5,991,279 A * | 11/1999 | Haugli | | H04B 7/216 |
| | | | | 370/320 |
| 6,084,869 A * | 7/2000 | Fishman | | H04B 7/2123 |
| | | | | 370/348 |
| 6,108,318 A * | 8/2000 | Kolev | | H04W 28/18 |
| | | | | 370/324 |
| 6,335,920 B1 * | 1/2002 | Strodtbeck | | H04B 7/2125 |
| | | | | 370/332 |
| 6,944,140 B1 * | 9/2005 | Linsky | | H04B 7/18515 |
| | | | | 370/323 |
| 10,772,052 B2 * | 9/2020 | O'Shea | | H04W 52/0251 |
| 2002/0167918 A1 * | 11/2002 | Brewer | | H04B 7/1858 |
| | | | | 370/324 |
| 2007/0008916 A1 * | 1/2007 | Haugli | | H04B 7/2041 |
| | | | | 370/320 |
| 2013/0109299 A1 * | 5/2013 | Roos | | H04B 7/18513 |
| | | | | 455/12.1 |
| 2015/0262110 A1 * | 9/2015 | Henriques | | G06Q 10/0631 |
| | | | | 705/7.14 |
| 2016/0233949 A1 * | 8/2016 | Tillet | | H04W 4/10 |
| 2017/0034250 A1 * | 2/2017 | Sobhani | | H04W 84/06 |
| 2017/0085328 A1 * | 3/2017 | Dickemann, Jr. | | H04H 20/02 |
| 2018/0092020 A1 * | 3/2018 | Torres | | H04L 45/021 |
| 2020/0112942 A1 * | 4/2020 | Foster | | H04W 16/02 |
| 2021/0105092 A1 * | 4/2021 | Hajimiri | | H04B 7/0697 |

FOREIGN PATENT DOCUMENTS

| | | | | |
|---|---|---|---|---|
| WO | WO-9903215 A1 * | 1/1999 | | H04B 7/18517 |
| WO | WO-9919994 A2 * | 4/1999 | | H04B 7/18521 |
| WO | WO-0055989 A1 * | 9/2000 | | H04B 7/18595 |
| WO | WO-0072468 A1 * | 11/2000 | | H04B 7/18567 |
| WO | WO-0126251 A2 * | 4/2001 | | H04B 7/18567 |
| WO | WO-2004073229 A2 * | 8/2004 | | H04B 17/40 |
| WO | WO-2017190094 A1 * | 11/2017 | | H04B 7/18521 |
| WO | WO-2018160842 A1 * | 9/2018 | | H04B 17/309 |

OTHER PUBLICATIONS

Hughes, "The View from Jupiter: High-Throughput Satellite Systems", www.hughes.com, pp. 1-16 (Jul. 2013).

* cited by examiner

SYSTEMS AND METHODS FOR PRIVATE COMMUNICATIONS NETWORKS

FIELD OF THE TECHNOLOGY

The disclosed technology relates to systems and methods for private communications networks. In particular, the disclosed system and methods relate to private communications networks that include earth stations configured to communicate with a multi-spot beam satellite.

BACKGROUND

Developments in communications infrastructure increasingly provide greater connectivity between devices and geographic regions. This connectivity is enabled by public communications networks that route network traffic. Public communication networks, however, introduce security risks such as vulnerability to hacking and electronic intrusion. While encryption, firewalls, and other measures provide added security, they are not insurmountable.

Other attempts to address these security risks have involved the deployment of private local area networks (LAN). A private LAN does not connect to public infrastructure, so while devices on the private LAN can communicate with each other, devices outside the private LAN cannot reach the devices in the private LAN. Private LANs also have drawbacks, however. They are generally implemented only on a local scale, and each private LAN requires fully dedicated network equipment.

Thus, existing attempts to address network risks are inadequate in terms of security, scope, and/or cost. Accordingly, there is continued interest in the development of improved communication networks.

SUMMARY

The disclosed technology relates to systems and methods for private communications networks.

In one aspect of the disclosed technology, a communication system in accordance with the disclosed technology includes a private communications network that has earth stations configured to communicate with a multi-spot beam satellite. The earth stations are communicatively unreachable by communication sources that are remote from the earth stations and that are outside the private communications network, and the earth stations are distributed across geographies covered by different spot beams of the multi-spot beam satellite. In various embodiments, the earth stations configured to communicate with the multi-spot beam satellite utilizing Ku-band communications and/or Ka-band communications.

In various embodiments, the private communications network is physically connected to and services a power infrastructure. In various embodiments, the power infrastructure includes power grid control infrastructure, and the earth stations are physically connected to the power grid control infrastructure.

In various embodiments, the private communications network further includes a gateway earth station configured to communicate with remote earth stations from among the earth stations, where the remote earth stations are located within a subgroup of spot beams of the multi-spot beam satellite. In various embodiments, the power infrastructure includes switching centers and power plants that are physically connected to at least one of the remote earth stations.

In various embodiments, the private communications network further includes optical fiber. In various embodiments, the power grid control infrastructure includes a national power grid operations facility, wherein the optical fiber physically connects the gateway earth station to the national power grid operations facility.

In various embodiments, the private communications network further includes a first microwave transceiver connected to a first earth station from among the earth stations and further includes a second microwave transceiver connected to a facility of the power infrastructure that is not connected to any of the earth stations. The first microwave transceiver and the second microwave transceiver are configured to be in communication and to communicatively couple the facility with the private communications network.

In an aspect of the disclosed technology, a disclosed communication system includes a gateway earth station configured to communicate with remote earth stations via a multi-spot beam satellite. The remote earth stations form a portion of a private communications network and are distributed across geographies covered by different spot beams of the multi-spot beam satellite. The remote earth stations are communicatively unreachable by communication sources that are remote from the remote earth stations and that are outside the private communications network. Optical fiber physically connects the gateway earth station to a facility, which is communicatively unreachable by communication sources that are remote from the facility and that are outside the private communications network.

In various embodiments, the gateway earth station is configured to communicate with the multi-spot beam satellite utilizing Ku-band communications and/or Ka-band communications. In various embodiments, the facility is a power grid control facility.

In various embodiments, the gateway earth station and the multi-spot beam satellite are configured to communicate power grid control messages. The gateway earth station is configured to encrypt power grid control messages transmitted to the multi-spot beam satellite and to decrypt power grid control messages received from the multi-spot beam satellite. In various embodiments, the gateway earth station is configured to communicate the power grid control messages to particular remote earth stations via the multi-spot beam satellite.

In an aspect of the disclosed technology, a disclosed method includes accessing a first power grid control message intended for a first power grid facility located in a first spot beam of a multi-spot beam satellite, and accessing a second power grid control message intended for a second power grid facility located in a second spot beam, where the second spot beam and the first spot beam cover different geographic regions. The method further includes addressing the first power grid control message to a network address of a first remote earth station connected to the first power grid facility, addressing the second power grid control message to a network address of a second remote earth station connected to the second power grid facility, and communicate the first power grid control message and the second power grid control from a gateway earth station to the multi-spot beam satellite.

In various embodiments, the gateway earth station, the first remote earth station, and the second remote earth station are configured to communicate with the multi-spot beam satellite utilizing Ku-band communications and/or Ka-band communications.

DETAILED DESCRIPTION

The disclosed technology relates to private communications networks that include earth stations configured to communicate with a multi-spot beam satellite. Recently, spot beam satellites have become more widespread. Prior to spot beams, satellites used large beams that were designed to cover large geographic areas, such as the entire continental United States. A spot beam, in contrast, covers a much smaller geographic area, such as, for example, a 200 kilometer diameter area.

Each has advantages and disadvantages. A large beam allows any two earth stations within the beam to communicate with each other by relaying a communication originating within the beam area back onto the beam area. In this architecture, the satellite broadcasts the communication back onto the beam area, and each earth station within the beam area discards any communications not intended for it, while keeping only communications that are intended for it. Thus, if the large beam covers the entire continental United States, any two earth stations in the continental U.S. could communicate with each other through a single satellite relay. This large geographic coverage comes at the cost of lower data capacity, however, because a particular frequency band can only be used for a single communication at any point in time.

Spot beams, on the other hand, provide greater data capacity. When multiple spot beams are sufficiently far apart geographically, they can utilize the same frequency band at any point in time without interfering with each other. Thus, the geographic dispersion of spot beams allows spectral reuse, which leads to higher overall data capacity. Because a spot beam covers a much smaller area, simply relaying communications back onto the same spot beam area becomes ineffective when two parties are located in geographies covered by different spot beams. To address this issue, spot beam systems are designed so that each spot beam is assigned to one or more so-called "gateway" earth stations, which coordinate communications across different spot beams, as described in more detail herein in connection with FIG. 5. Thus, while multi-spot beam systems have higher overall data capacity, the coordination by gateways can potentially result in longer communication latency.

Multi-spot beam systems have security advantages as well. Whereas an eavesdropper in a large beam system can be located anywhere in the large beam area (such as the continental United States) to intercept communications from the satellite on that beam, a potential eavesdropper in a multi-spot beam system must travel to different geographic locations to intercept different spot beams. Thus, for networks dispersed across geographies covered by different spot beams, the network should be less susceptible to a system-wide intrusion if it uses a multi-spot beam satellite rather than a large beam satellite.

In accordance with the disclosed technology, a private communications network can be established to use a multi-spot beam satellite. An example of such a satellite includes the Jupiter 1 and 2 satellites owned by Hughes Corporation, but other multi-spot beam satellites are within the scope of the disclosed technology. It is contemplated that a multi-spot beam satellite in accordance with the disclosed technology can utilize communications in the Ku-band, in the Ka-band, and/or in other frequency bands. Embodiments of the disclosed systems and methods will now be described with reference to the Figures. Although the following description will focus on providing a private communications network for the power infrastructure, applications of the disclosed technology in other environments or for other purposes are contemplated, including application of a private communications network for retail, education, or research, for example.

Figure 1:
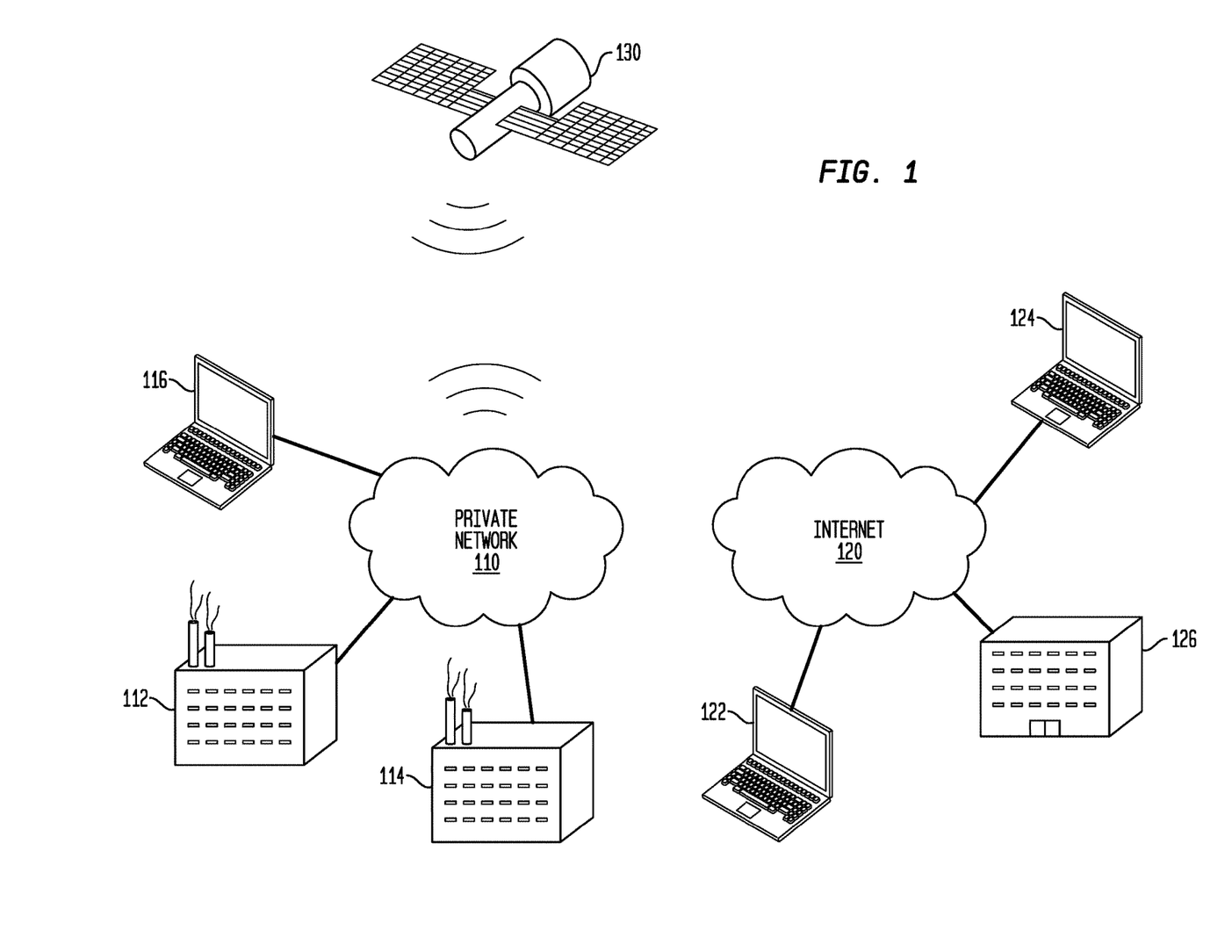
FIG. 1 shows a diagram of a private communications network that is separate from the Internet.

Referring now to FIG. 1, there is shown a diagram of a private communications network 110 that is separate from the public Internet infrastructure 120. In accordance with aspects of the disclosed technology, the private communications network 110 can be geographically distributed and can utilize a multi-spot beam satellite 130. Various devices and facilities in different geographic locations can connect to the private communications network 110 and can communicate with each other via the multi-spot beam satellite 130. As mentioned above, the multi-spot beam satellite 130 can utilize communications in the Ku-band, in the Ka-band, and/or in other frequency bands.

In various embodiments, the private communications network 110 can be deployed for a power infrastructure, such as the power grid of the United States. Accordingly, the illustrated facilities 112, 114 can be power plants, switching centers, or operation control centers, or other facilities or equipment for the power grid. The illustrated device 116 can be an operator terminal in a power grid operations facility.

In accordance with aspects of the disclosed technology, devices and facilities 112-116 serviced by the private communications network 110 can be communicatively unreachable by communication sources that are remote therefrom and that are outside the private communications network 110, such as by the devices and facilities 122-126 connected to the public Internet 120. In various embodiments, the devices and facilities 112-116 serviced by the private communications network 110 can be unaddressable from outside the private communications network 110. In various embodiments, there is no communication path for a remote device 122, 124 on the public Internet 120 to reach the devices and facilities 112-116 on the private communications network 110. Because the private communications network 110 is communicatively unreachable by devices on the public Internet 120, there is lesser risk of intrusion by hackers, which is especially important for power infrastructure devices and facilities.

Figure 2:
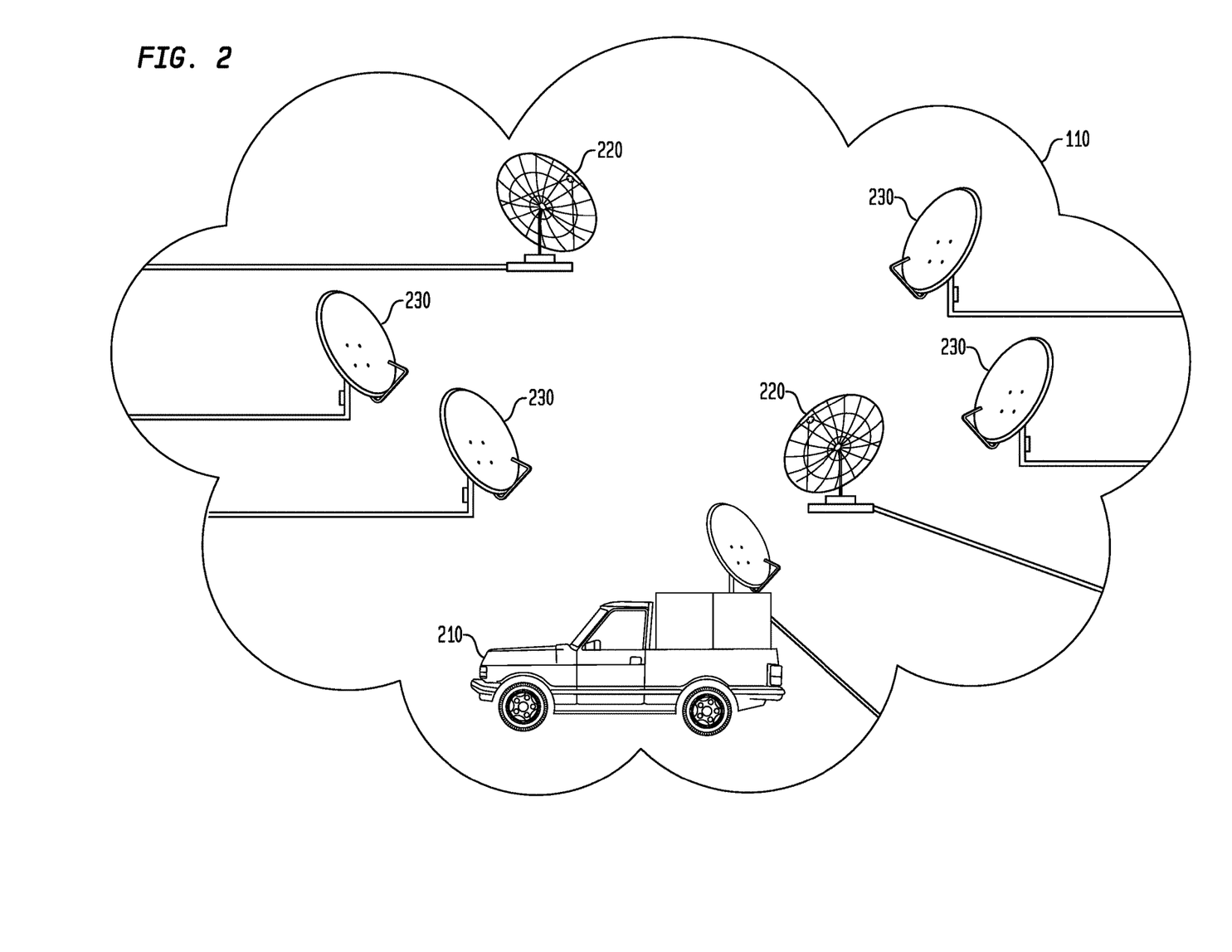
FIG. 2 shows a private communications network that includes earth stations, in accordance with aspects of the disclosed technology.

Referring now to FIG. 2, there is shown a diagram of exemplary earth stations that may be included in the private communications network 110 for communicating with the multi-spot beam satellite (FIG. 1, 130). In the illustrated embodiment, the private communications network 110 includes mobile earth stations 210, gateways 220, and very small aperture terminals (VSAT) 230. However, other types of earth stations will be recognized by persons skilled in the art and are contemplated to be within the scope of the disclosed technology, such as, but not limited to, receive-only earth stations. The earth stations 210-230 in the illustrated embodiment can be geographically distributed and are configured to communicate with the multi-spot beam satellite (FIG. 1, 130). In various embodiments, each earth station may be located in a different spot beam. In various embodiments, groups of earth stations may be located in the same spot beam. As mentioned above, the private communications network 110 can include gateway earth stations 220, which coordinate communications across different spot teams and geographic areas.

Figure 3:
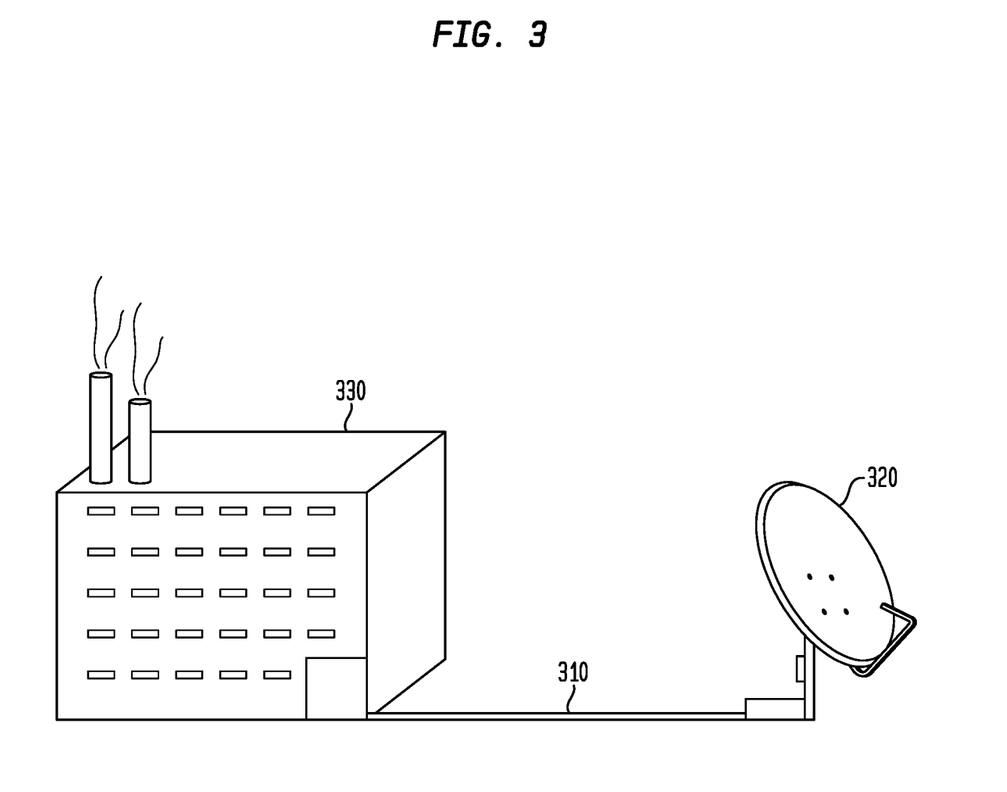
FIG. 3 shows a diagram of a facility connected to an earth station, in accordance with aspects of the disclosed technology.

With reference also to FIG. 3, the private communications network can include physical connections 310 from the earth stations 320 to the facilities 330 or devices they service. In various embodiments, the physical connections 310 can include optical fiber, twisted pair cable, coaxial cable, and/or other types of physical connections. In various embodiments, the private communications network can include wireless connections (not shown) from the earth stations 320 to the facilities 330 or devices they service, such as, but not limited to, WiFi/WiMax and other point to multipoint terrestrial systems connections utilizing 802.11b/g/n protocols or microwave relay.

With continuing reference to FIG. 3, an earth station 320 can service and connect to a power infrastructure facility 330. In various embodiments, if the facility 330 is a national power grid operations facility, the facility 330 can be serviced by a gateway earth station 320 and can be connected to the gateway 320 by optical fiber 310. In various embodiments, if the facility 330 is a power plant or a power grid control infrastructure, the facility 330 can be serviced by a VSAT 320 and can be connected to the VSAT 320 by optical fiber 319. Other types of earth stations and connections are contemplated and are within the scope of the disclosed technology. Additionally, facilities other than power infrastructure facilities can be serviced by the earth station, such as, retail facilities, educational facilities, and research facilities.

When the facility 330 wishes to communicate with another facility, messages from the facility 330 are communicated to the earth station 320, which encrypts and modulates the message and transmits it to the multi-spot beam satellite. Various types of encryption, modulation, and communications technologies can be used by the earth station, including time division multiple access, frequency division multiple access, error correction coding, quadrature amplitude modulation, phase shift keying, networking protocols, among other technologies. When the earth station 320 receives messages designated for the facility 330, the earth station 320 demodulates and decrypts the message and forwards it to the facility 330. In various embodiments, the earth station 320 is assigned a network address for receiving communications from the satellite. In various embodiments, the earth station 320 is assigned a frequency channel or time channel for communications with the satellite. The earth station 320 may receive communications designated for other earth stations in the same spot beam. Based on the address, the frequency channel, and/or the time channel assigned to the earth station, the earth station 320 can identify and target the communications designated for it and can discard or disregard the communications designated for other earth stations.

Figure 4:
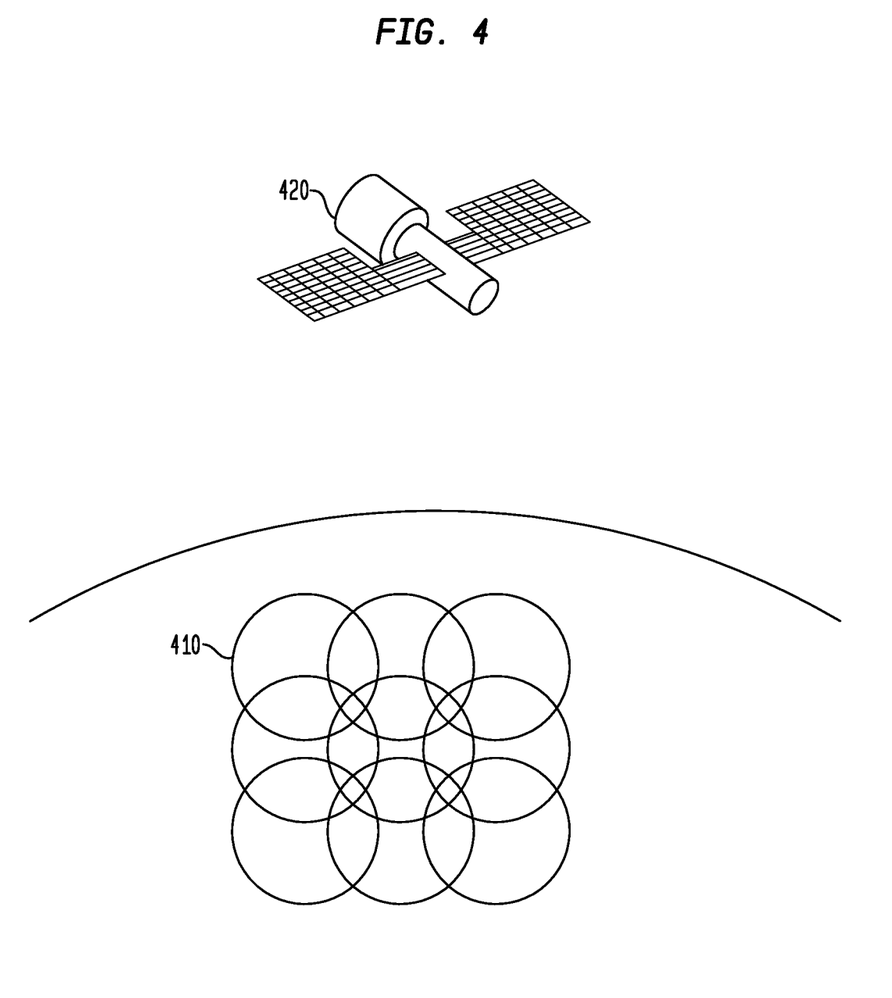
FIG. 4 shows a diagram of a multi-spot beam satellite and spot beams, in accordance with aspects of the disclosed technology.

Referring now to FIG. 4, there is shown an exemplary configuration of geographic regions serviced by different spot beams 410 of a multi-spot beam satellite 420. As mentioned above, each spot beam can have a diameter of approximately 200-300 kilometers and can utilize technologies such as frequency division multiple access, time division multiple access, and networking protocols. For spot beams that are sufficiently separated, they may utilize the same frequency bands without interfering with each other.

Figure 5:
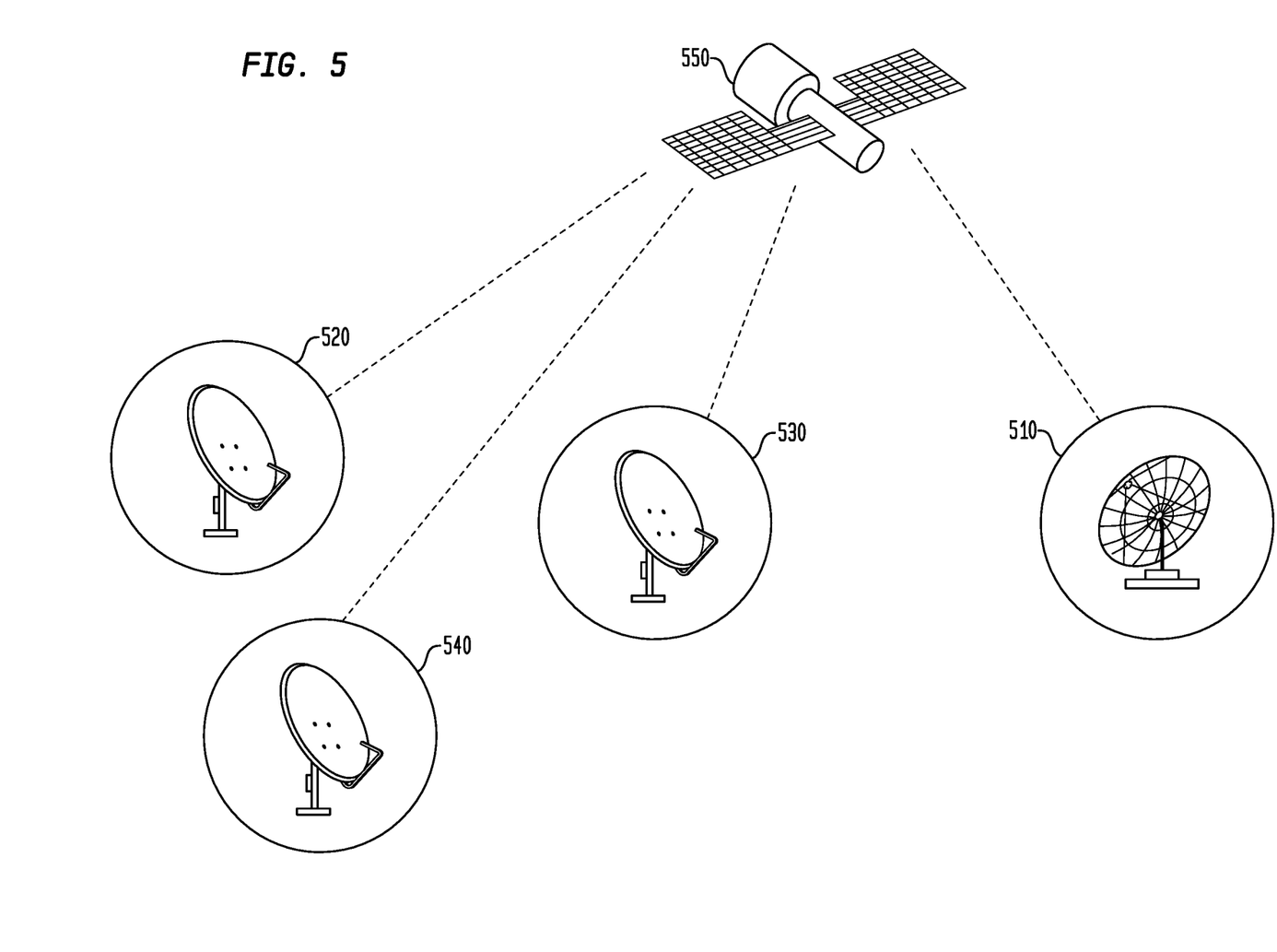
FIG. 5 shows a gateway earth station in communication with remote earth stations, in accordance with aspects of the disclosed technology.

With reference also to FIG. 5, certain spot beams service gateway earth stations 510 that coordinate communications between remote earth terminals located in different spot beams 520-540. In various embodiments, each remote earth station 520-540 directly communicates with only the gateway 510, through the multi-spot beam satellite 550. The gateway 510, however, is configured to directly communicate with several remote earth stations 520-540, through the satellite 550.

Even though the satellite 550 operates multiple spot beams 510-540, is configured to service multiple earth stations within each spot beam, and can utilize networking protocol technologies, it is not part of the public Internet infrastructure because frequency channels and time channels utilized by individual earth stations 520-540 in a particular spot beam are dedicated to the individual earth station. Frequency or time channel hopping technologies can be utilized, but while a particular frequency or time channel is being used for an earth station in a particular spot beam, it is not usable by other earth stations in that spot beam. In contrast, in a public network, multiple sources and destination devices share the same channels in the public network, and there is no exclusivity. This is a significant problem with the Internet because potentially anyone can access the information sources and the information flowing in and through the Internet.

Accordingly, what have been described herein are systems and methods for private communications networks that include earth stations configured to communicate with a multi-spot beam satellite. The following will describe a method of communicating power grid control messages from a gateway earth station.

Figure 6:
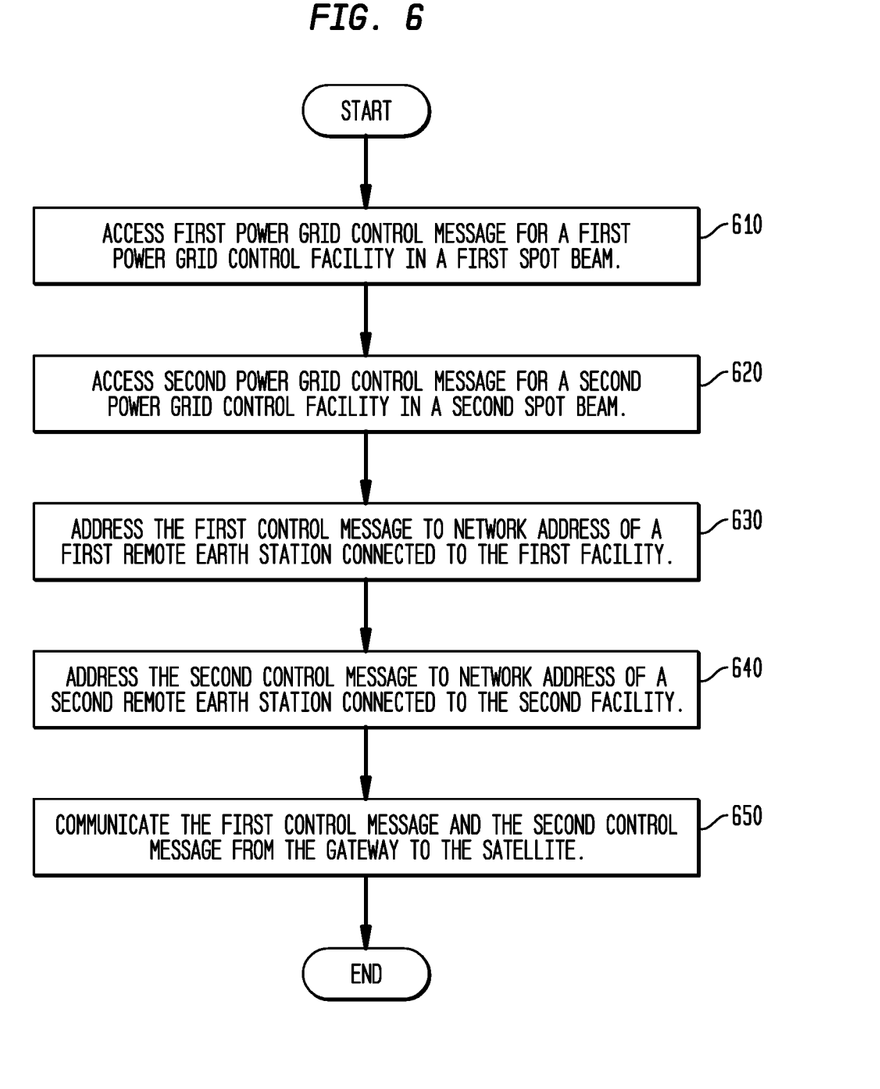
FIG. 6 is a flow diagram of a method of communicating power grid control messages, in accordance with aspects of the disclosed technology.

Referring to FIG. 6, the disclosed method includes accessing power grid control messages intended for different remote earth stations located in different spot beams (610, 620). The control messages include a power grid control message intended for a power grid facility located in one spot beam and a power grid control message intended for another power grid facility located in another spot beam. Each facility is connected to a separate earth station. To communicate the first power grid control message, the message is addressed to the network address of the remote earth station connected to the first power grid facility (630). To communicate the second power grid control message, the message is addressed to the network address of the remote earth station connected to the second power grid facility (640). Once properly addressed, the power grid control messages are communicated from the gateway to the multi-spot beam satellite (650). The multi-spot beam satellite then relays the control messages to the proper spot beams, which are then received by the intended remote earth stations and by the power grid facilities connected to them.

Accordingly, what have been described are systems and methods for private communications networks. Those skilled in the art will recognize that the disclosed embodiments are illustrative and do not limit the scope of the disclosed technology. It is contemplated that various embodiments can be combined in ways that may not be expressly illustrated or described herein, but which are within the scope of the disclosed technology. The scope of the disclosed technology will be defined by the claims, which are appended hereto.

What is claimed is:

1. A communication system comprising:
   a private communications network comprising:
      a plurality of earth stations configured to communicate with a multi-spot beam satellite, the plurality of earth stations being communicatively unreachable from devices on a public Internet infrastructure and by communication sources that are remote from the plurality of earth stations and that are outside the private communications network, the private communications network being physically connected to and servicing a power infrastructure, and
      a first microwave transceiver connected to a first earth station of the plurality of earth stations and a second microwave transceiver connected to a facility of the power infrastructure that is not connected to any of the plurality of earth stations, the first microwave transceiver and the second microwave transceiver configured to be in communication and to communicatively couple the facility with the private communications network;
   wherein the plurality of earth stations is distributed across geographies covered by different spot beams of the multi-spot beam satellite, and
   wherein the private communications network is physically separate from and has no communication path to or from the public Internet infrastructure by which a hacker on the public Internet infrastructure could hack the private communications network.

2. A communication system as in claim 1, the plurality of earth stations configured to communicate with the multi-spot beam satellite utilizing at least one of Ku-band communications or Ka-band communications.

3. A communication system as in claim 1, wherein the power infrastructure includes power grid control infrastructure, wherein the plurality of earth stations is physically connected to the power grid control infrastructure.

4. A communication system as in claim 3, wherein the private communications network further includes a gateway earth station configured to communicate with a plurality of remote earth stations among the plurality of earth stations, the plurality of remote earth stations being located within a subgroup of spot beams of the multi-spot beam satellite.

5. A communication system as in claim 4, wherein the private communications network further includes optical fiber.

6. A communication system as in claim 5, wherein the power grid control infrastructure includes a national power grid operations facility, wherein the optical fiber physically connects the gateway earth station to the national power grid operations facility.

7. A communication system as in claim 4, wherein the power infrastructure includes switching centers and power plants that are physically connected to at least one of the remote earth stations.

8. A communication system as in claim 1, wherein earth stations among the plurality of earth stations are configured to communicate with each other by addressing communications to each other, the multi-spot beam satellite relaying the addressed communications to the spot beams corresponding to the addresses.

* * * * *